US008907137B2

(12) United States Patent
Carlberg et al.

(10) Patent No.: US 8,907,137 B2
(45) Date of Patent: Dec. 9, 2014

(54) EPOXY RESIN PRODUCTION

(75) Inventors: Philip J. Carlberg, Lake Jackson, TX (US); Thomas C. Young, Lake Jackson, TX (US); Tina L. Arrowood, Coleman, MI (US); Ernesto Occhiello, Horgen (CH); Paul R. Elowe, Midland, MI (US); Jason C. MacDonald, Bay City, MI (US)

(73) Assignee: Dow Global Technologies LLC, Midland, MI (US)

( * ) Notice: Subject to any disclaimer, the term of this patent is extended or adjusted under 35 U.S.C. 154(b) by 170 days.

(21) Appl. No.: 13/144,958

(22) PCT Filed: Feb. 25, 2010

(86) PCT No.: PCT/US2010/025379
§ 371 (c)(1),
(2), (4) Date: Jul. 18, 2011

(87) PCT Pub. No.: WO2010/099295
PCT Pub. Date: Sep. 2, 2010

(65) Prior Publication Data
US 2011/0301366 A1 Dec. 8, 2011

Related U.S. Application Data

(60) Provisional application No. 61/155,792, filed on Feb. 26, 2009.

(51) Int. Cl.
*C07C 41/03* (2006.01)
*C08G 65/38* (2006.01)

(52) U.S. Cl.
CPC ............ *C08G 65/38* (2013.01); *C08G 2650/56* (2013.01)
USPC ........................................................ 568/640

(58) Field of Classification Search
CPC ..... C08K 5/134; C07C 43/2055; C07C 41/26
USPC ............................................. 549/17; 568/640
See application file for complete search history.

(56) References Cited

U.S. PATENT DOCUMENTS

| | | | |
|---|---|---|---|
| 4,269,952 A | 5/1981 | Locatelli | |
| 4,276,406 A | 6/1981 | Monnerat et al. | |
| 4,284,573 A | 8/1981 | Arnett et al. | |
| 4,373,073 A | 2/1983 | Wojtech et al. | |
| 4,390,680 A | 6/1983 | Nelson | |
| 4,408,062 A | 10/1983 | Bertram et al. | |
| 4,499,255 A | 2/1985 | Wang et al. | |
| 4,582,892 A | 4/1986 | Chang et al. | |
| 4,751,280 A | 6/1988 | Pham et al. | |
| 5,416,235 A * | 5/1995 | Gilbert et al. | 558/350 |
| 6,211,389 B1 | 4/2001 | Dimke | |
| 6,448,414 B1 | 9/2002 | Jacobsen et al. | |
| 6,693,206 B2 | 2/2004 | Liu et al. | |
| 6,800,766 B2 | 10/2004 | Jacobsen et al. | |
| 6,846,961 B2 | 1/2005 | Teles | |
| 7,220,870 B2 | 5/2007 | Jacobsen et al. | |
| 2010/0256329 A1 | 10/2010 | Nozaki et al. | |

FOREIGN PATENT DOCUMENTS

EP 180123 A2 2/1987
EP 0356854 A2 3/1990

OTHER PUBLICATIONS

Patani, 1996, Chem. Rev., vol. 96, p. 3147-3176.*
Martell, 1968, Catalytic Effects of Metal Chelate Compounds, retrieved from www.iupac.org/publications/pac/pdf/1968/pdf/1701x0129.pdf, p. 129-178.*
Gupta, 2008, Coordination Chemistry Reviews, vol. 252, p. 1420-1450.*
Annis, D. Allen, and Eric N. Jacobsen. "Polymer-Supported Chiral Co(Salen) Complexes: Shynthetic Applications and Mechanistic Investigations in the Hydrolytic Kinetic Resolution of Terminal Epoxides." *Journal of the American Chemical Society.* 121.17 (1999): 4147-54.
Baleizao, Carlos, and Hermenegildo Garcia. "Chiral Salen Complexes: An overview to recoberable and reusable Homogeneous and Heterogeneous Catalysts." *Chemcial Reviews.* 106.9 (2006): 3987-4043.
Gill, Christopher S., Venkatasubbaiah Krishnan, et al. "Enhanced Cooperativity through Design:Pendant CoIII-Salen Polymer Brush Catalysts for the Hydrolytic Kinetic Resolution of Epichlorohydrin (Salen=N,N'-Bis(salicylidene)ethylenediamine Dianion)." *Chemistry A European Journal.* 14. (2008): 7306-13.
Hu, Daodao, Yu Fang, et al. "Studies on CoSalen Immobilized onto N-(4-Methylimidazole)-Chitosan." *Journal of Applied Polymer Science.* 101.4 (2006): 2431-36.
Darensbourg, Donald J., and Shawn B. Fitch. "An Exploration of the Coupling Reactions of Epoxides and Carbon Dioxide Catalyzed by Tetramethyltetraazaannulene Chromium (III) Derivatives: Formation of Copolymers versus Cyclic Carbonates." *Inorganic Chemistry.* 47.24 (2008): 11868-78.
Cotton, F. Albert, Joanna Czuchajowska, et al. "A Five-coordinate, High-spin Chromium (III) Complex: Cr(tmtaa)Cl." *Inorganica Chimica Acta.* 172. (1990): 135-136.
Martinez, Luis E., James L. Leighton, Douglas H. Carsten, and Eric N. Jacobsen. "Highly Enantioselective Ring Opening of Epoxides Catalyzed by (salen)Cr(III) Complexes." *Journal of the American Chemical Society.* 117. (1995): 5897-98.
Ready, Joseph M., and Eric N. Jacobsen. "Asymmetric Catalytic Synthesis of α-Aryloxy Alcohols: Kinetic Resolution of Terminal Epoxides via Highly Enantioselective Ring_opening with Phenols." *Journal of the American Chemical Society.* 121. (1999): 6086-87.
Tokunaga, Makoto, Jay F. Larrow, Fumitoshi Kakiuchi, and Eric N. Jacobsen. "Asymmetric Catalysis with Water: Efficient Kinetic Resolution of Terminal Epoxides by Means of Catalytic Hydrolysis." *Science.* 277. (1997): 936-938.

(Continued)

*Primary Examiner* — Rebecca Anderson
*Assistant Examiner* — Karen Cheng

(57) ABSTRACT

A process comprising contacting a polyhydric phenol or a polyaliphatic alcohol with an epihalohydrin in the presence of a catalyst comprising a Schiff base metal complex is disclosed.

11 Claims, No Drawings

(56) References Cited

OTHER PUBLICATIONS

Zheng, Xiaolai, Christopher W. Jones, and Marcus Weck. "Ring Expanding Olefin Metathesis: A Route to Highly Active Unsymmetrical Macrocyclic Oligomeric Co-Salen Catalysts for the Hydrolytic Kinetic Resolution of Epoxides." *Journal of the American Chemical Society.* 129. (2007): 1105-12.

Lee, Kwang-Yeon, Choong-Young Lee, and Geon-Joong Kim. "Asymmetric Synthesis of a α-Aryloxy Alcohols Via Kinetic Resolution of Terminal Epoxides Catalyzed by (R,R)-N,N'-Bis(2-Hydroxy-5-tert-Butylsalisilidine)-1,2-Cyclohexenediamino Cobalt." *Reaction Kinetics and Catalysis Letters.* 93.1 (2008): 75-83.

Kim, Geon-Joong, and Dae-Woon Park. "The Catalytic Activity of New Chiral Salen Complexes Immobilized on MCM-41 in teh Asymmetric Hydrolysis of epoxides to Diols." *Catalysis Today.* 63. (2000): 537-47.

Kwon, Mi-Ae, and Geon-Joong Kim. "Synthesis of Polymeric Salen Complexes and Application in the Enantioselective Hydrolytic Kinetic Resolution of Epoxides as Catalysts." *Catalysis Today.* 87. (2003): 145-51.

Orejon, Aranzazu, Anna M. Masdeu-Brulto, et al. "Strategies for the Immobilizaiton of Homogeneous Catalysts and Their Use in the Synthesis of Carbamates." *Industrial & Engineering Chemistry Research.* 47.21 (2008): 8032-36.

Song, Yuming, Huilin Chen, et al. "Highly Enantioselective Resolution of Terminal Epoxides with Cross-linked Polymeric Salen-Co(III) Complexes." *Tetrahedron Letters.* 44. (2003): 7081-85.

Streitberger et al. "Epoxidharze" Roempp Onlineno 2007. Retrieved from http://www.roempp.com/prod/index1.html.

White, "Development and mechanistic studies of a highly active and selective oligomeric (salen)co(III) catalyst for asymmetric epoxide ring opening reactions" *Harvard University Thesis* (2005),p. 55, p. 169-174.

Yang, Hengquan, Lei Zhang, et al. "Asymmetric Ring-Opening of Epoxides on Chiral Co(Salen) Catalyst Synthesized in SBA-16 through the "ship in a bottle" Strategy." *Journal of Catalysis.* 248. (2007): 204-12.

Zheng, Xiaolai, Christopher W. Jones, and Marcus Weck. "Engineering Polymer-Enhanced Bimetallic Cooperative Interactions in the Hydrolytic Kinetic Resolution of Epoxides." *Advanced Syntheses and Catalysis.* 350. (2008): 255-261.

Zheng, Xiaolai, Christopher W. Jones, et al. "Poly(styrene)-Supported Co-Salen Complexes as Efficient Recyclable Catalysts for the Hydrolytic Kinetic Resolution of Epichlorohydrin." *Chemistry—A European Journal.* 12.2 (2006): 576-83.

PCT/US2010/025379 International Search Report and Written Opinion of the International Searching Authority.

PCT/US2010/025379 International Preliminary Report on Patentability.

Lowry, Mechanism and Theory in Organic Chemistry, The Hammett Equation, 3rd Edition, p. 143-149.

* cited by examiner

EPOXY RESIN PRODUCTION

This application claims the benefit of U.S. Provisional Application 61/155,792, filed on Feb. 26, 2009.

FIELD OF THE INVENTION

Embodiments disclosed herein relate generally to a process of producing epoxy resins by contacting either a polyhydric phenol or polyaliphatic alcohol with an epihalohydrin in the presence of a Schiff base catalyst.

BACKGROUND OF THE INVENTION

Epoxy resins are generated in a two-step process. In the first step, either a polyhydric phenol or polyaliphatic alcohol is contacted with an epihalohydrin under base catalyzed conditions to form a halohydrin ether. In the second step, the halohydrin ether is contacted with a compound selected from the group consisting of alkali hydroxides and alkaline earth hydroxides to form an epoxy resin.

Typically, the base catalyst used in the first step can be either a Bronsted base (eg., sodium hydroxide) or a nucleophile (eg., $R_4N^+Cl^-$). These catalysts can produce undesirable effects. One example of this is homo-oligomerization of the epihalohydrin, resulting in raw material inefficiency. Another example is the formation of halohydrin ether products where the epihalohydrin ring opening occurs at the more hindered carbon, resulting in the presence of a bound halide in the liquid epoxy resin, since it will not undergo oxirane formation in the second step in the process. Further examples of side reactions include hydrolysis of the epihalorohydrin, and formation of halohydrin ether products where more than one epihalohydrin have been added at single OH initiation site. To control these primary side chemistries, the coupling chemistry is completed under very mild temperature conditions resulting in long reaction times on the order of several hours to days.

Therefore, it would be beneficial to utilize catalysts that minimize these undesirable effects.

SUMMARY OF THE INVENTION

An embodiment of the invention discloses a process comprising, consisting of, or consisting essentially of: a) contacting either a polyhydric phenol or a polyaliphatic alcohol with an epihalohydrin in the presence of a catalyst comprising a Schiff base metal complex in a reaction zone under reaction conditions to produce a first reaction product comprising a halohydrin ether.

An embodiment of the invention can also further comprise b) contacting the halohydrin ether with a base in a reaction zone under reaction conditions to produce a second reaction product comprising an epoxy resin.

DETAILED DESCRIPTION OF THE INVENTION

In an embodiment of the invention, either a polyaliphatic alcohol or a polyhydric phenol, such as bisphenol A, is contacted with an epihalohydrin, such as epichlorohydrin, in the presence of a catalyst comprising a Schiff base metal complex to form a halohydrin ether. The resulting halohydrin ether can then contacted with a base to form an epoxy resin.

Suitable polyhydric phenols that may be used in embodiments disclosed herein include, but are not limited to, those mononuclear and polynuclear polyhydric phenols represented by the formulas

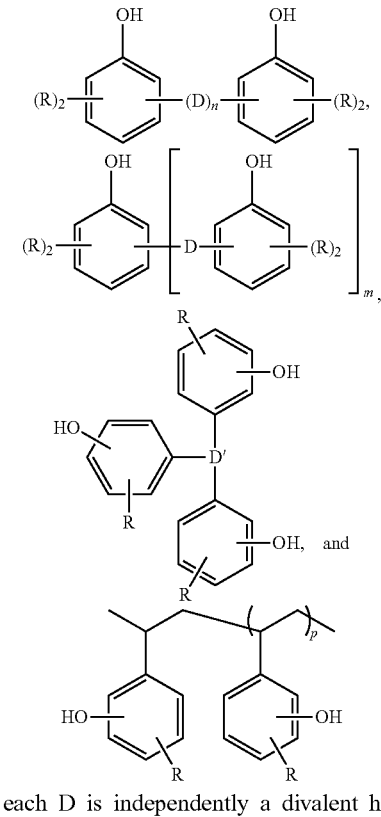

wherein each D is independently a divalent hydrocarbon group having from 1 to about 12 carbon atoms,

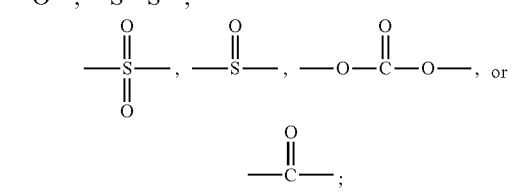

D' is a trivalent hydrocarbon group having from 1 to about 12 carbon atoms; each R is independently hydrogen, a hydrocarbyl group having from 1 to about 10 carbon atoms, a halogen atom, such as chlorine or bromine, or a hydroxyl group; p has a value of from about 1 to about 100; m has a value from about 1 to about 6; and n has a value of zero or 1.

Other polyhydric phenols are described in U.S. Pat. Nos. 4,582,892 and 4,373,073, which are incorporated herein by reference. Suitable polycyclopentadiene polyphenols and methods for their preparation can be found in U.S. Pat. No. 4,390,680, which is incorporated herein by reference. In an embodiment, the polyhydric phenol bisphenol A is used.

Suitable polyaliphatic alcohols that may be used in embodiments disclosed herein are chemicals which contain two or more aliphatic alcohol groups, and include, but are not limited to glycols and polyols such as 1,3-propanediol, 1,4-butanediol, 1,5-pentanediol, 1,6-hexanediol, dipropylene glycol, polypropyleneglycol, ethylene glycol, polyethylene glycol, neopentyl glycol, cyclohexane diol, hydrogenated bisphenol A, cyclohexane dimethanol, alkoxylated glycerol, castor oil, sorbitol, glycerol, pentaerythritol, linseed oil, and trimethylolpropane.

Suitable epihalohydrins that may be used in embodiments disclosed herein include those represented by the formula

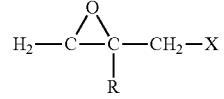

where R is hydrogen or a hydrocarbyl group having from 1 to about 4 carbon atoms and X is a halogen, such as chlorine or bromine. In an embodiment, epihalohydrin used is epichlorohydrin.

A monomer of the Schiff base metal complex catalyst is defined by the formula

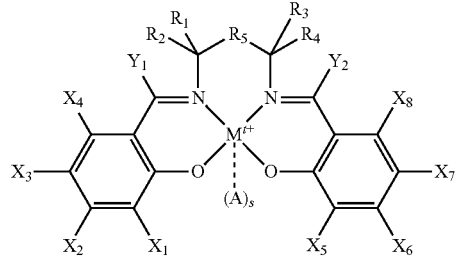

$R_1$, $R_2$, $R_3$, $R_4$, $Y_1$, $Y_2$, $X_1$, $X_2$, $X_3$, $X_4$, $X_5$, $X_6$, $X_7$, and $X_8$ can comprise, independently of one another, substituents selected from the group consisting of hydrogen, halogen, alkyl, alkenyl, alkynyl, hydrocarbyl, hydroxyl, amino, a nitro, alkoxyl, diol, amine, imine, amide, phosphoryl, phosphonate, phosphine, carbonyl, carboxyl, silyl, ether, thioether, sulfonyl, selenoether, ketone, aldehyde, and ester.

In an embodiment, two or more of $R_1$, $R_2$, $R_3$, $R_4$, $Y_1$, $Y_2$, $X_1$, $X_2$, $X_3$, $X_4$, $X_5$, $X_6$, $X_7$, and $X_8$ can together form a ring selected from the group consisting of a carbocyclic ring and a heterocyclic ring, the ring having from 4 to 10 atoms in the ring.

In an embodiment, $R_2$ and $R_4$ are absent and $R_1$ and $R_3$ can together form an aromatic ring;

$R_5$ is selected from the group consisting of carbon-carbon bond, methylene group, ethylene group, amine, an oxygen atom, and a sulfur atom.

Two or more of $R_1$, $R_2$, $R_3$, $R_4$, $Y_1$, $Y_2$, $X_1$, $X_2$, $X_3$, $X_4$, $X_5$, $X_6$, $X_7$, and $X_8$ are optionally capable of providing a complementary interaction to form an oligomer or polymer. The complementary interaction includes, but is not limited to: carbon-carbon coupling, condensation, etherification, amide formation, esterification, ring opening polymerizations, olefin metathesis, olefin polymerization such as radical polymerization cationic polymerization, anionic polymerization, group transfer polymerization, heterogeneous Ziegler-Natta polymerization, and homogeneous Ziegler-Natta polymerization.

$M^{t+}$ is a metal atom. M is generally selected from a Group 2-15 metal of the Periodic Table of Elements capable of complexing with a ligand to affect catalysis and t is an integer between 2 and 4. In an embodiment of the invention, M is cobalt, chromium, or aluminum. In an embodiment, M is cobalt.

A is selected from the group consisting of neutral groups, bound anionic groups, unbound anionic groups, and combinations thereof. In an embodiment, A is 3-nitrobenzenesulfonate, p-toluenesulfonate, camphorsulfonate, acetate, chloride, bromide, iodide, antimonyhexafluoride, hexafluorophosphate, tetrafluoroborate or tetraperfluorophenylborate. In an embodiment, A is 3-nitrobenzenesulfonate. S is the number of A groups associated with the metal and is an integer between 0 and 2.

The catalyst composition can be achiral, or racemic, non-racemic, or diasteriomeric mixture of chiral Schiff base monomers.

In an embodiment, the catalyst can be present as monomers, oligomers, polymers, co-polymers and combinations thereof. In an embodiment of the invention, the catalyst is present as a monomer or an oligomer bound to a support. In an embodiment, the oligomer has 1-20 repeat units of the above defined monomer. Examples of supports that can be used include but are not limited to organic polymers, ion-exchange resins, inorganic supports, metal organic frame works, and carbon. The catalyst can be incorporated into or onto the support by any suitable method known to those skilled in the art including, but not limited to, covalent bonding, ionic bonding, hydrogen bonding, metal complexing, encapsulating, and intercalating.

The following documents provide examples of such supporting techniques and their entire contents are herein disclosed by reference: Baleizo, et. al., Chemical Reviews, 2006, 106(9), 3987-4043, Orejón, et al., Industrial and Engineering Chemical Research, 2008, 47(21), 8032-8036; Yang, et al., Journal of Catalysis 2007, 248, 204-212, Kim, et al., Catalysis Today 2000, 63, 537-547.

In an embodiment of the invention, the catalyst can be incorporated into polymeric structures by utilizing any of several different methods. The following documents provide examples of such techniques and their entire contents are herein disclosed by reference. Hu, et al., Journal of Applied Polymer Science, Vol. 101, 2431-2436, Song, et al., Tetrahedron Letters 2003, 44, 7081-7085, Kwon, et al., Catalysis Today 2003, 87, 145-151, Gill, et al., Chemistry—A European Journal 2008, 14, 7306-7313, Zheng, et al., Chemistry—A European Journal 2006, 12, 576-583, Zheng, et al., Advanced synthesis and Catalysis 2008, 350, 255-261.

In an embodiment of the invention more than one of the composition is present and is joined by a polyfunctional A, wherein A is selected from the group consisting of a polycarboxylate, polysulfonate, and polytriflate or a mixture thereof.

In an embodiment of the invention more than one monomeric Schiff base composition can be linked with one or more Schiff base monomers to yield greater catalytic activity than the single monomer.

In embodiments of the invention, the catalysts can defined by the following formulas:

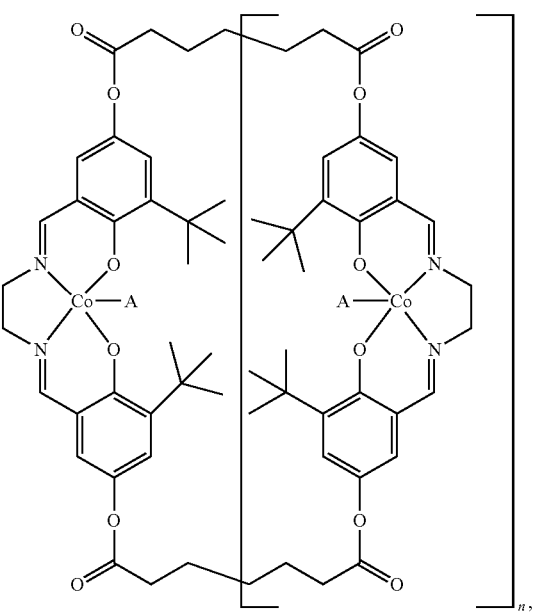

-continued

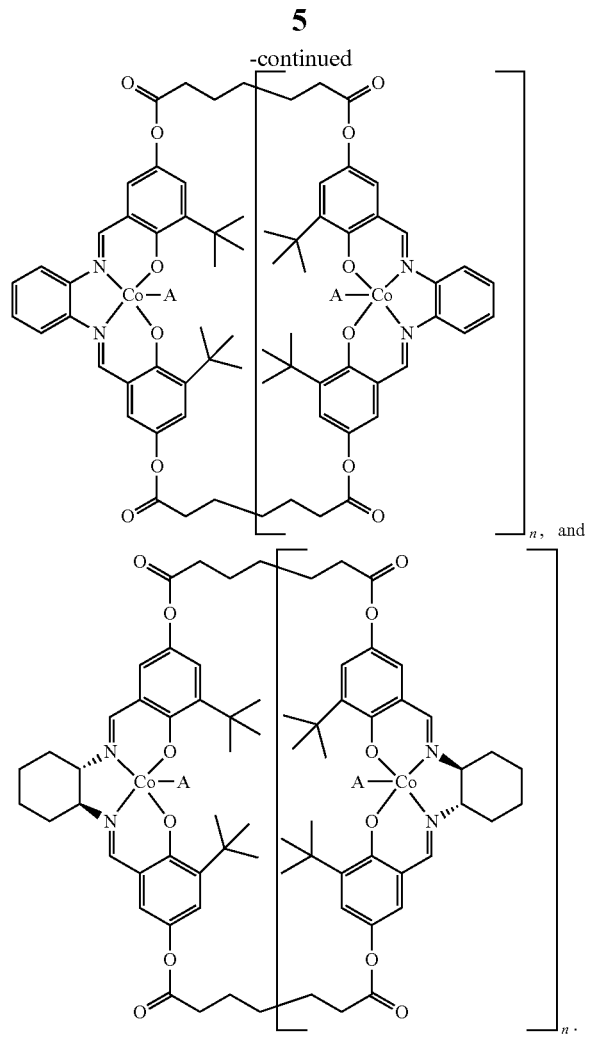

In each of the three above formulas, A is 3-nitrobenzenesulfonate and n is an integer between 1 and 3.

The amount of catalyst employed in step (a) is any quantity that will suitably catalyze the reaction between either the polyhydric phenol and the epihalohydrin or polyaliphatic alcohol and the epihalohydrin.

Embodiments disclosed herein may be performed without any added organic solvent. When used, suitable solvents may include but are not limited to ketones, aromatic hydrocarbons, halogenated aliphatic compounds, alcohols, and glycol ethers such as, for example, methyl isobutyl ketone, methyl ethyl ketone, toluene, xylene, methylene chloride, ethylene dichloride, isopropanol, 1-methoxy-2-propanol, and mixtures thereof.

In an embodiment, the epihalohydrin and the polyhydric phenol or polyaliphatic alcohol are present in a molar ratio of moles of epihalohydrin to mole equivalents of OH functional group from about from about 1:1 to about 40:1.

The reaction conditions in the reaction zones of both steps (a) and (b) can include a temperature in the range of from about −10° C. to about 140° C. In an embodiment, the reaction conditions can include a temperature in the range of from 0° C. to 60° C.

The halohydrin ether can be contacted with any suitable base. In an embodiment, the base can be an alkali metal or alkaline earth metal hydroxide. Examples of alkali hydroxides include, but are not limited to sodium hydroxide, potassium hydroxide, lithium hydroxide, calcium hydroxide or mixtures thereof. In an embodiment, sodium hydroxide is used. The base can be added either continuously or incrementally.

In an embodiment, steps (a) and (b) can be carried out in the same vessel. In an embodiment, steps (a) and (b) can be carried out in different vessels. The processes in the embodiments can be batch, semi-batch, or continuous processes.

In an embodiment, the ether products in step (a) have halohydrin ether or glycidyl ether functional end groups comprising greater than 95% of the general formulas

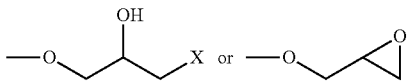

wherein X is a halogen. In another embodiment, the epoxy resin products in step (b) have less than 0.2 wt % halogen content.

EXAMPLES

The following examples are intended to be illustrative of the present invention and to teach one of ordinary skill in the art to make and use the invention. These examples are not intended to limit the invention in any way. Structural representations of the abbreviated names of the components typical in epoxy resin chemistry are provided in the table below:

ABBREVIATIONS

BPA (Bis-phenol A)

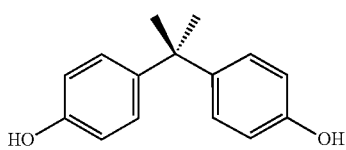

EPI (Epichlorohydrin)

-continued
MCHB (Monochlorohydrin ether of BPA)
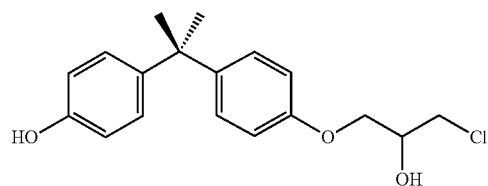
MGEB (Monoglycidyl ether of BPA)
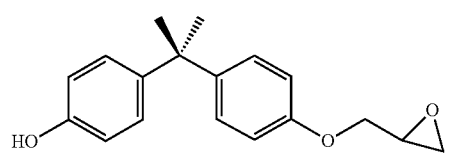
DCHR (Dichlorohydrin ether of BPA)
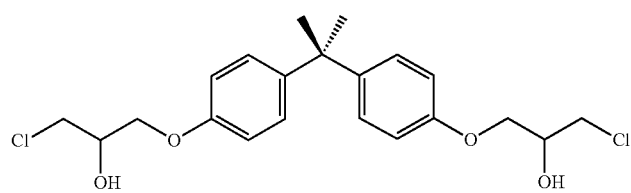
MCHR (Monochlorohydrin resin)
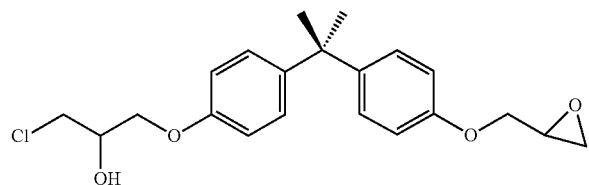
Branched coupled DCHR product
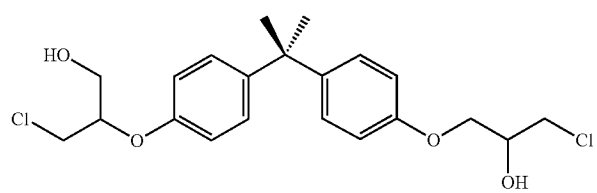
DCHR n = 1
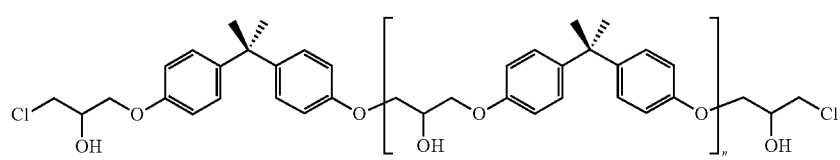

-continued
MCHR n = 1 (mixture of isomers)
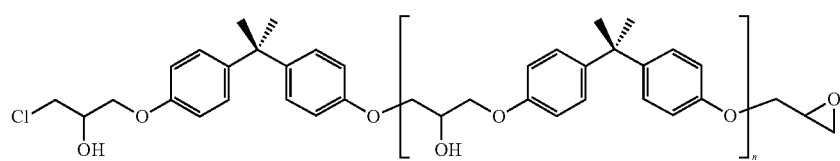
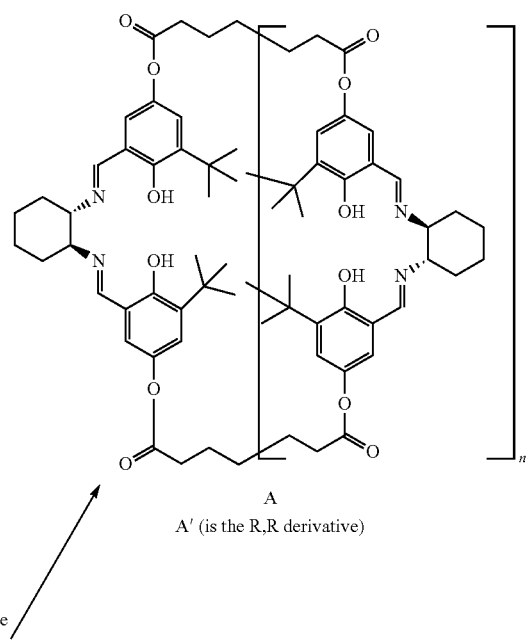
A
A' (is the R,R derivative)
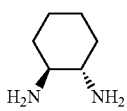
SS- diaminocyclohexane
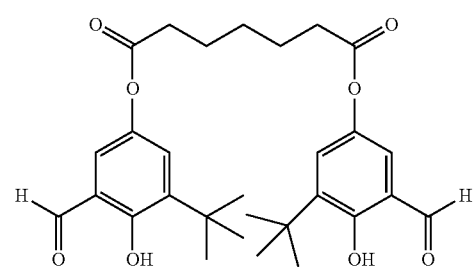
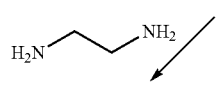
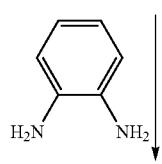
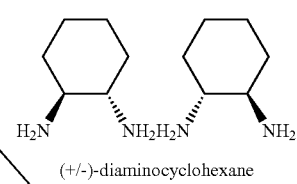
(+/−)-diaminocyclohexane

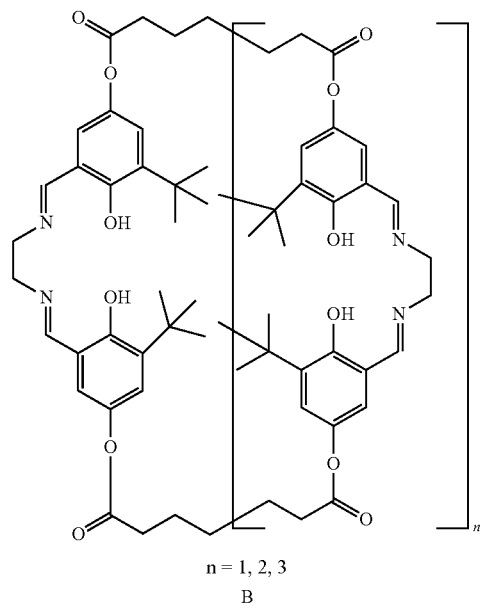

n = 1, 2, 3
B

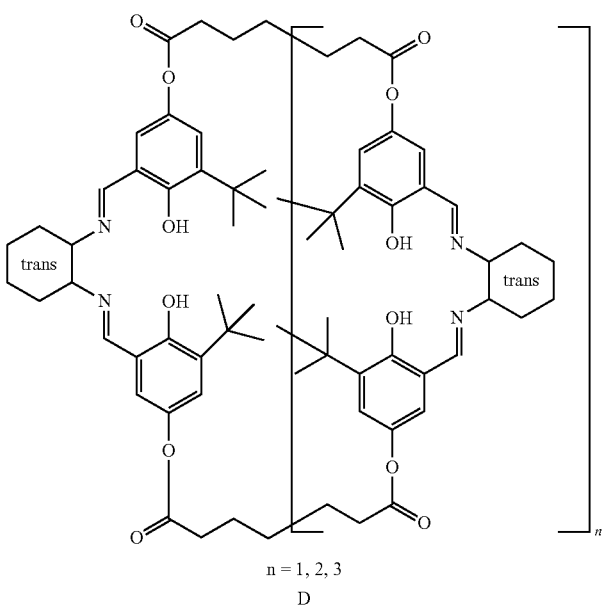

n = 1, 2, 3
D

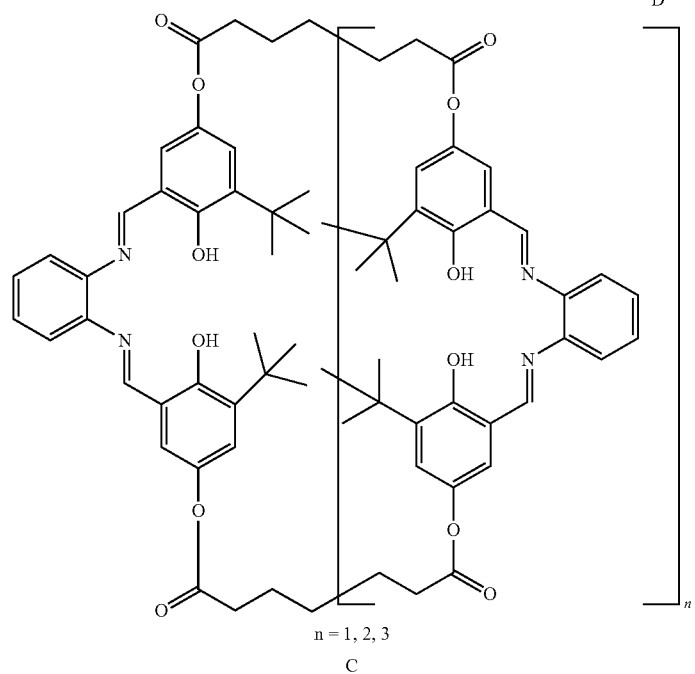

n = 1, 2, 3
C

Preparation of S,S-Cyclohexanediamine Oligomeric Salen Ligand (A) and R,R-Cyclohexanediamine Oligomeric Salen (A').

Prepared as per procedure described in White, D. E., Harvard University Thesis: "Development and mechanistic studies of a highly active and selective oligomeric (salen)Co(III) catalyst for asymmetric epoxide ring opening reactions" 2005, pp. 169-174.

Preparation of Ethylenediamine Oligomeric Salen Ligand (B)

A round bottom flask (100 mL) with a teflon coated stir bar was charged with bis(3-t-butyl-5-formyl-4-hydroxyphenyl) heptanedioate (0.40 g, 0.78 mmol, synthesized as per procedure provided by White, D. E., Harvard University Thesis: "Development and mechanistic studies of a highly active and selective oligomeric (salen)Co(III) catalyst for asymmetric epoxide ring opening reactions" 2005, p. 172), ethane-1,2-diamine (0.047 g, 0.78 mmol) and benzene (50 mL). The round bottom flask was equipped with a Dean-Stark trap and a cold water condenser. The reaction was placed under a $N_2$ atmosphere and was refluxed for 18 hours. The reaction mixture was diluted with diethyl ether (50 mL) and washed with deionized water (50 mL). The organic layer was dried over $MgSO_4$, filtered and upon rotary evaporation and further drying in vacuo (50° C.), afforded 330 mg (39% yield) of yellow/orange solids.

Preparation of Phenylenediamine Oligomeric Schiff Base Ligand (C)

A round bottom flask (100 mL) with a Teflon coated stir bar was charged with bis(3-t-butyl-5-formyl-4-hydroxyphenyl) heptanedioate (0.40 g, 0.78 mmol, synthesized as per procedure provided by White, D. E., Harvard University Thesis: "Development and mechanistic studies of a highly active and selective oligomeric (salen)Co(III) catalyst for asymmetric epoxide ring opening reactions" 2005, p. 172), benzene-1,2-diamine (0.048 g, 0.44 mmol) and benzene (50 mL). p-Toluene sulfonic acid (PTSA, 0.035 g, 0.19 mmol) was added into the reaction mixture and the round bottom flask was equipped with a Dean-Stark trap and a cold water condenser. The reaction was placed under a $N_2$ atmosphere, stirred magnetically and refluxed overnight. The following morning an aliquot of the reaction mixture was concentrated to dryness and dissolved in $CDCl_3$ for $^1H$ NMR analysis which showed near complete consumption of the starting dialdehyde. The undissolved PTSA was filtered and the benzene solution was washed with d.i. water and dried over $MgSO_4$. Filtration, removal of solvent by rotary evaporation and in vacuo drying afforded 0.43 g (94%) of orange solids.

Preparation of Diasteriomeric Trans-Diaminocyclohexane Oligomeric Salen (D)

A round bottom flask (250 mL) was equipped with a Teflon coated stir bar and charged with Bis(3-t-butyl-5-formyl-4-hydroxyphenyl) heptanedioate (0.512 g, 0.999 mmol, synthesized as per procedure provided by White, D. E., Harvard University Thesis: "Development and mechanistic studies of a highly active and selective oligomeric (salen)Co(III) catalyst for asymmetric epoxide ring opening reactions" 2005, p. 172), trans-diaminocyclohexane (0.114 g, 0.999 mmol) and benzene (75 mL). The reaction was heated to 50° C. for 1.5 hours and checked for progression by HPLC at which time no remaining free dialdehyde was detected. The round bottom flask was fitted with a Dean-Stark trap and the reaction was refluxed for 8 hours overnight. An aliquot of the reaction mixture was diluted in fresh benzene and analyzed by HPLC showing two unresolved peaks at 21.715 and 21.751 minutes by evaporative light scattering detector. The reaction mixture was diluted with ethyl acetate (30 mL) and loaded into a separation funnel. The organic mixture was washed successively with d.i. water and brine. Upon phase separation, the organic layer was dried over $MgSO_4$, filtered and concentrated to dryness by rotary evaporation followed by in vacuo drying. By $^1H$ NMR, it was determined that benzene was present in the product so the solids were dissolved in methylene chloride and concentrated by rotary evaporation twice and finally dried in vacuo, thus yielding yellow/brown crystalline solid 0.580 g (98%).

General preparation of Co(III) Schiff base complexes: Co(II) acetate tetrahydrate (0.036 g, 0.14 mmol) was made into a solution with 2 mL of methanol in an inert atmosphere box. This solution was added to a toluene (3 mL) solution of the Schiff base ligand (0.083 mmol) and allowed to stir under anaerobic conditions for 1.5 h. The mixture was concentrated under vacuum leaving a brick red solid residue. To this was added 0.083 mmol of organic acid (3-nitrobenzenesulfonic acid*$1H_2O$, toluenesulfonic acid, or acetic acid) and the mixture was taken up into 10 mL of methylenechloride and 2 mL of toluene. The mixture was removed from the glovebox and allowed to stir open to air overnight. After solvent removal the brownish/green solid was used without further purification (each complex is noted as "ligand"-Co(III)-X, where X=3-nitrobenzenesulfonate, p-toluenesulfonate, or acetate depending on the acid used in the oxidation step).

Preparation of A'-Co(III)-Cl complex: A'-Co(III)-3NOBS (0.05 g) was made into a solution with acetonitrile and washed with an aqueous solution of NaCl six times. The acetonitrile solution was concentrated yielding the solid catalyst (A'-Co(III)-Cl) which was used without further purification.

Preparation of A'-Cr(III)-Cl complex: (ref. *Inorganic Chem.* 2008, 47(24), 11868-11878. *Inorg. Chim. Acta.* 1990, 172, 135-136) A' (0.100 g, 0.169 mmol) and Cr(III)Cl (0.027 g, 0.169 mmol) were weighed into a 2 necked 50 mL round bottomed flask. To this was added 10 mL of Toluene and 0.034 g (0.34 mmol) triethylamine (note: Cr(III) Cl is not soluble in toluene). The mixture was stirred and heated at 100° C. for 3 days. After 24 hrs the solution turned brown and after 3 days a precipitate was observed and the solution was dark brown with a brick red tint when lit with a flashlight. The toluene solution was removed and washed with water and dried. The residual solid precipitate was not soluble in toluene or water, but had some solubility in acetonitrile. The toluene solution was concentrated and $^1H$ NMR of the residue was consistent with starting ligand. The solid precipitate taken up into acetonitrile was observed to be the active coupling catalyst (Note: $CrCl_3$ is not an active catalyst).

Monomeric Si-supported Salen (E):

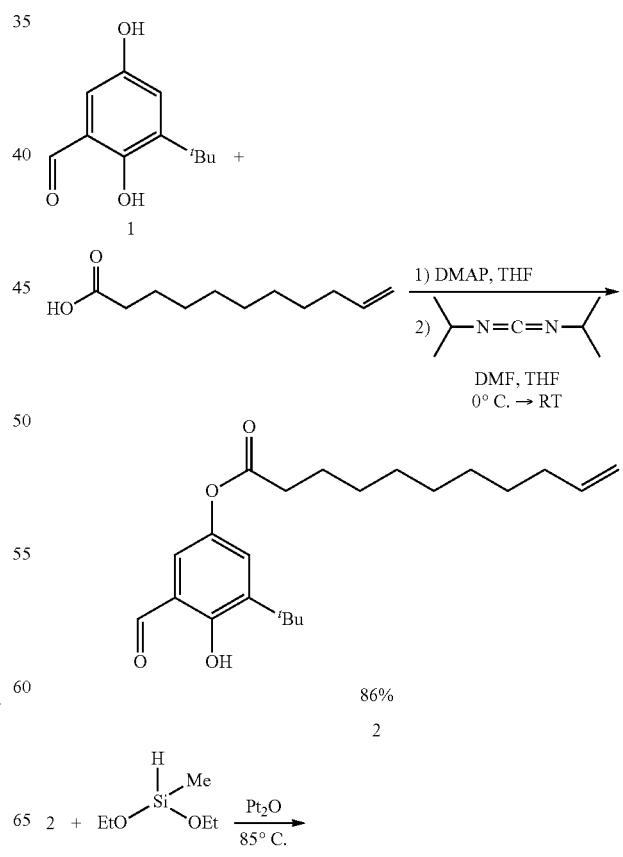

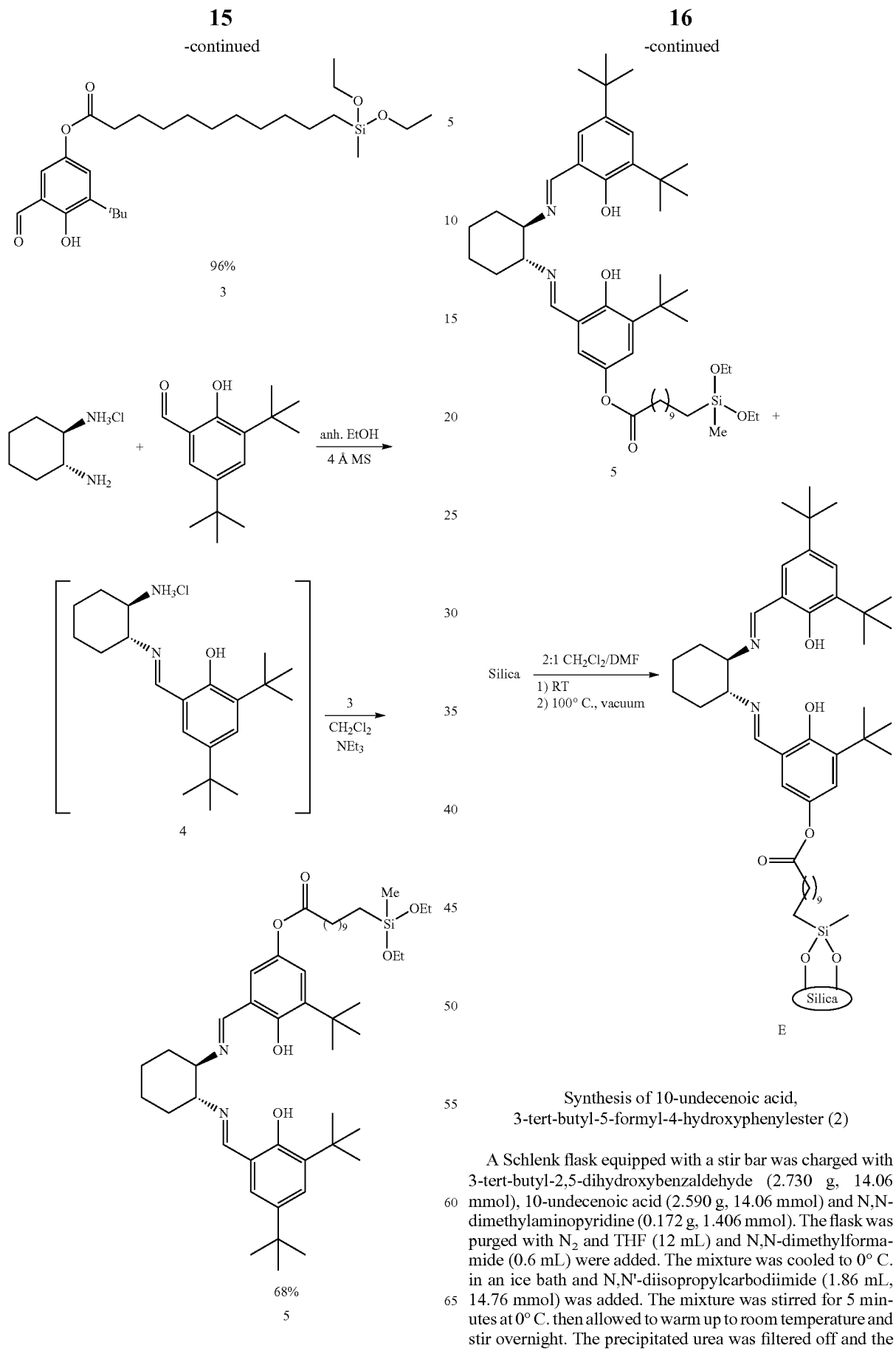

Synthesis of 10-undecenoic acid, 3-tert-butyl-5-formyl-4-hydroxyphenylester (2)

A Schlenk flask equipped with a stir bar was charged with 3-tert-butyl-2,5-dihydroxybenzaldehyde (2.730 g, 14.06 mmol), 10-undecenoic acid (2.590 g, 14.06 mmol) and N,N-dimethylaminopyridine (0.172 g, 1.406 mmol). The flask was purged with $N_2$ and THF (12 mL) and N,N-dimethylformamide (0.6 mL) were added. The mixture was cooled to 0° C. in an ice bath and N,N'-diisopropylcarbodiimide (1.86 mL, 14.76 mmol) was added. The mixture was stirred for 5 minutes at 0° C. then allowed to warm up to room temperature and stir overnight. The precipitated urea was filtered off and the mixture washed with 6 mL water. THF was then removed under vacuum. The crude orange liquid was purified by flash chromatography using hexane:ethyl acetate (4:1) to give 4.354 g (86%) of a yellow-orange liquid. $^1$H NMR(RT, 500 MHz, $C_6D_6$): δ=12.09 (s, 1H), 9.08 (s, 1H), 7.30 (d, $J_{HH}$=5 Hz, 1H), 6.77 (d, $J_{HH}$=5 Hz, 1H), 5.79 (m, 1H), 5.02 (m, 2H), 2.33 (t, $J_{HH}$=13 Hz, 2H), 1.99 (m, 2H), 1.65 (m, 2H), 1.37 (s, 9H), 1.35-1.17 (m, 10H). $^{13}$C NMR (RT, 126 MHz, $C_6D_6$): δ=196.3, 171.6, 158.9, 143.1, 139.9, 139.1, 123.6, 120.5, 114.6, 35.25, 34.52, 34.30, 29.82, 29.72, 29.57, 29.55, 29.42, 29.27, 29.25, 25.37.

Synthesis of 3-tert-butyl-5-formyl-4-hydroxyphenyl-11-(diethoxy(methyl)silyl)-undecanoate (3)

In a 50 mL round-bottomed flask was weighed the olefin-tethered hydroxybenzaldehyde 2 (1.939 g, 5.379 mmol) and diethoxymethylsilane (0.939 g, 6.9924 mmol). $Pt_2O$ (0.009 g, 0.040 mmol) was then added. The flask was equipped with a reflux condenser and the mixture was stirred at 85° C. for 20 hrs. After reaction, the mixture was taken up in anhydrous ethanol (20 mL) and filtered through activated carbon. Volatiles were then removed in vacuo to give 2.541 g (96%) of a yellow-orange oily liquid as a single regioisomer. Note: previous attempts at synthesizing 3 using stoichiometric amounts of diethoxymethylsilane led to small amounts of unreacted starting olefinic material. $^1$H NMR (RT, 500 MHz, $C_6D_6$): δ=12.12 (s, 1H), 9.06 (s, 1H), 7.31 (s, 1H), 6.76 (s, 1H), 3.71 (q, $J_{HH}$=7 Hz, 4H), 2.33 (t, $J_{HH}$=7.5 Hz, 2H), 1.67 (m, 2H), 1.53 (m, 2H), 1.37 (s, 9H), 1.35-1.20 (m, 10H), 1.17 (t, $J_{HH}$=7 Hz, 6H), 0.73 (m, 2H), 0.17 (s, 3H). $^{13}$C NMR (RT, 126 MHz, $C_6D_6$): δ=196.3, 171.6, 158.9, 143.1, 139.9, 123.6, 120.5, 58.24, 35.25, 34.53, 33.90, 30.10, 30.07, 29.95, 29.81, 29.62, 29.27, 25.40, 23.64, 18.92, 14.75, –4.28. $^{29}$Si NMR (RT, 99 MHz, $C_6D_6$): δ=–5.97 (s).

Synthesis of 3-tert-butyl-5-(E)-((1R,2R)-2-((E)-3,5-di-tert-butyl-2-hydroxybenzylideneamino)-cyclohexylimino)methyl)-4-hydroxyphenyl-11-(diethoxy(methyl)-silyl)undecanoate (5)

In a two-necked 250 mL flask was placed 1R,2R-diaminocyclohexane monohydrochloride (0.255 g, 1.693 mmol), 3,5-di-tert-butyl-2-hydroxybenzaldehyde (0.397 g, 1.693 mmol) and 4 Å molecular sieves (0.166 g). The flask was placed under a nitrogen atmosphere and anhydrous ethanol (10 mL) was syringed in to give a yellow mixture. The mixture was allowed to stir overnight. $^1$H NMR of an aliquot confirmed that the reaction proceeded (with only ca. 3% of the starting aldehyde remaining). Tethered benzaldehyde 3 (0.397 g, 1.693 mmol) was dissolved in 6 mL of $CH_2Cl_2$ and syringed into the reaction flask. $NEt_3$ (0.47 mL, 3.385 mmol) was then syringed dropwise over 5 min. The mixture was allowed to stir overnight under nitrogen. The reaction was then filtered through a pad of silica gel on a glass frit and washed with $CH_2Cl_2$. The filtrate was rotovaped to give a yellow oily residue, which was purified by flash chromatography (95% hexane: 5% ethyl acetate; $R_f$=0.15) to give a bright yellow oil (0.931 g, 68%). $^1$H NMR (RT, 300 MHz, $C_6D_6$): δ=14.15 (s, 1H), 13.96 (s, 1H), 7.90 (s, 1H), 7.72 (s, 1H), 7.48 (d, $J_{HH}$=2.5 Hz, 1H), 7.19 (d, $J_{HH}$=2.5 Hz, 1H), 6.95 (d, $J_{HH}$=2.5 Hz, 1H), 6.81 (d, $J_{HH}$=2.5 Hz, 1H), 3.71 (q, $J_{HH}$=7 Hz, 4H), 2.84 (m, 2H), 2.32 (t, $J_{HH}$=7.5 Hz, 2H), 1.70-1.21 (m, 24H), 1.60 (s, 9H), 1.48 (s, 9H), 1.26 (s, 9H), 1.17 (t, $J_{HH}$=7 Hz, 6H), 0.72 (m, 2H), 0.17 (s, 3H). $^{13}$C NMR (RT, 76 MHz, $C_6D_6$): δ=171.7, 166.5, 165.4, 158.6, 158.3, 142.6, 140.2, 138.7, 136.8, 127.1, 126.4, 123.3, 122.1, 118.6, 118.4, 72.17, 71.88, 58.21, 35.46, 35.26, 34.61, 34.32, 33.90, 33.09, 33.04, 31.76, 30.09, 30.06, 29.93, 29.88, 29.82, 29.62, 29.49, 25.44, 24.46, 23.61, 18.89, 14.69, –4.33.

Synthesis of Silica-Supported Monomeric Salen Ligand E.

In a 50 mL flask was placed amorphous silica gel (0.320 g; 200 m$^2$/g, fully hydroxylated; previously activated in a 100° C. vacuum oven for 20 hrs). Monomeric salen ligand 5 (2.31 mL; as a 0.0411 M solution in 2:1 $CH_2Cl_2$/DMF, 0.095 mmol) was syringed on top of the silica. The sides of the flask were rinsed with 1 mL $CH_2Cl_2$ and the slurry was stirred under nitrogen at room temperature for 30 min. Vacuum was applied on the mixture to evaporate $CH_2Cl_2$ and most of the DMF, after which the flask was placed in a 100° C. oil bath under vacuum for overnight stirring under full vacuum. After 20 hrs, the contents of the flask were rinsed with $CH_2Cl_2$ and filtered through a glass frit, with sequential washes of $CH_2Cl_2$, MeOH and $CH_2Cl_2$. The solid was collected into a vial and dried in a vacuum oven at 50° C. for 48 hrs to give a bright yellow powder (0.345 g). The yellow filtrate was concentrated in vacuo to yield 0.034 g of a yellow oil, E; ligand concentration based on weight difference is calculated as 157 μmol/$g_{solid}$. Thermogravimetric analysis of a sample revealed a ligand concentration of 149 μmol/$g_{solid}$. Elem. anal. found (%): C, 7.1; N, 0.38. C/N wt % ratio calcd. for $C_{44}H_{68}N_2O_6Si$: 18.86. Found: 18.68.

Synthesis of Silica-Supported Monomeric Cobalt(III)-Salen Complex (E-Co(III)-3NOBS).

In a nitrogen-purged glovebox, a vial was charged with silica-supported ligand E (0.055 g, 0.008 mmol ligand) and a stir bar. In a separate vial, $Co(OAc)_2 \cdot 4H_2O$ (0.003 g, 0.011 mmol) was dissolved in 3 mL of MeOH/toluene (1:1) to give a pink solution, which was then added to the supported ligand and allowed to stir for 30 min. The mixture immediately turned orange-red. The red mixture was filtered through a glass frit and washed with MeOH and $CH_2Cl_2$. The solid was then placed in a vial and 3-$NO_2$—$C_6H_4SO_3H \cdot xH_2O$ where x is approximately 1 (0.002 g, 0.009 mmol) was added as a suspension in $CH_2Cl_2$. The resulting mixture, which turned dark green, was allowed to stir overnight. After evaporation of the volatiles, the remaining green solid was rinsed and washed copiously with MeOH and $CH_2Cl_2$, before being dried in a vacuum oven.

Synthesis of Silica-Supported Monomeric Cobalt(III)-Salen Complex (E-Co(III)-SbF$_6$).

In a nitrogen-purged glovebox, a vial was charged with silica-supported ligand E (0.10 g, 0.015 mmol ligand) and a stir bar. In a separate vial, $Co(OAc)_2 \cdot 4H_2O$ (0.004 g, 0.015 mmol) was dissolved in 5 mL of MeOH/toluene (1:1) to give a pink solution, which was then added to the supported ligand and allowed to stir for 30 min. The mixture immediately turned orange-red. The red mixture (E-Co(II)) was filtered through a glass frit and washed with MeOH and $CH_2Cl_2$ and dried under vacuum for 1.5 h. The E-Co(II) complex (0.070 g, 0.0105 mmol ligand) was placed in a vial and a solution of AgSbF$_6$ (3.61 mg, 0.0105 mmol) in 1 mL of acetonitrile was added and the mixture was slurried in the dark for 24 hours. The resulting mixture was filtered and washed several times with acetonitrile then dried in a vacuum oven at 50° C. to yield 0.06 g of E-Co(III)-SbF$_6$ which was used without further purification.

General BPA/EPI coupling reaction (batch): Co(III)-Schiff base catalyst (0.4 mol % relative to BPA) was weighed into a thick-walled vial fitted with a magnetic stir bar. To this was added a 9/1 mole ratio of EPI to Bis-phenol A. The mixture was capped and allowed to stir at room temperature. After 1 hour the reaction mixture was sampled and analyzed by HPLC. In some cases a second analysis was completed at a later time. The results are summarized in the table below.

| Complex | % BPA conversion (rxn time in hrs) | Area % branched chlorohydrin | BPA | MCHB | MGEB | DCHR | MCHR | DGEBA | DCHR n = 1 | MCHR n = 1 |
|---|---|---|---|---|---|---|---|---|---|---|
| 50:50 A/A'-Co(III)—3NOBS | 99 (1 h) | trace (<0.06) | 0.78 | 0.11 | 0.1 | 98.41 | 0.17 | | | |
| B-Co(III)—3NOBS | 23 (1 h); 66 (23 h) | not detected | 77.6 (43.8) | 9.9 (28.2) | 5.4 (4.4) | 1.1 (4.1) | 0.9 (3.0) | | | |
| C-Co(III)—3NOBS | 47 (1 h); 99.9 (67 h) | trace (<0.11) | 53.7 (0.09) | 36.1 (7.8) | 2.1 (0.85) | 4.7 (88.13) | 1.2 (0.6) | | | |
| D-Co(III)—3NOBS | 44 (1 h); 99.9 (67 h) | trace (<0.17) | 56.1 (.10) | 27.05 (8.9) | 4.6 (1.3) | 3.97 (83.6) | 2.14 (1.86) | | | |
| E-Co(III)—3NOBS | 95.4 (1 h) | trace (<0.10) | 4.6 | 0.26 | 0 | 94.03 | 0.6 | | | |
| A'-Co(III)—OTs | 99 (1 h) | not detected | 0.87 | 27.46 | 0.93 | 64.47 | 0.3 | | | |
| A'-Co(III)—OAc | 88 (1 h) | not detected | 11.25 | 52.09 | 0.48 | 28.45 | 1.78 | | | |
| A'-Co(III)—Cl | 20 (1 h) | not detected | 79.98 | 15.82 | 2.63 | 0.61 | 0.67 | | | |
| A'-Cr(III)—Cl | 100 (4 h) | not detected | 0 | 6.7 | 1.21 | 55 | 21.28 | 2.18 | 7.42 | 2.9 |

Product composition in % (excess EPI is not included)
(numbers in parenthesis represents composition at second reaction time noted)

BPA = bis-phenol A
MCHB = monochlorohydrin ether of bis-phenol A
MGEB = monoglycidyl ether of bis-phenol A
DCHR = dichlorohydrin ether of bis-phenol A
MCHR = monochlorohydrin-monoglycidyl ether of bis-phenol A
DGEBA = diglycidyl ether of bis-phenol A
DCHR n = 1 = dichlorohydrin of diglycidyl ether of bis-phenol A
MCHR n = 1 = monochlorohydrin of diglycidyl ether of bis-phenol A General BPA/EPI coupling reaction (continuous, fixed bed reaction): A Pall brand Acrodisc® CR 25 mm syringe filter with a 0.2 μm PTFE membrane was packed (female end) with 30 mg of silica supported Co(III) complex (E-Co(III)-SNOBS or E-Co(III)-SbF$_6$). A syringe (20 mL) containing a 9/1 mole mixture of epichlorohydrin and bis-phenol A was attached to the female end of the syringe filter and the entire assembly was placed onto a vertically positioned (syringe pointing down) lab scale syringe pump. The syringe pump was set to feed 0.12 mL/h of the epichlorohydrin/bis-phenol A mixture through the filter hosting the catalyst. The material on the exit end of the syringe filter was collected in a vial which was replaced periodically and analyzed by HPLC for composition. The results are summarized in the table below.

| sample | flow rate ml/h | sample (grm) | elapsed time (h) | total time | BPA | MCHB | DCHR | MCHR | other |
|---|---|---|---|---|---|---|---|---|---|
| E-Co(III)—3NOBS | | | | | | | | | |
| 1 | 0.12 | 0.48 | 3 | 3 | 53.649 | 7.7807 | 30.1795 | 0.5972 | 7.7936 |
| 2 | 0.12 | 0.887 | 3.75 | 6.75 | 21.5051 | 14.0916 | 61.9198 | 0.8773 | 1.6062 |
| 3 | 0.12 | 1.25 | 12.75 | 19.5 | 32.7877 | 23.2477 | 42.547 | 0.57 | 0.8476 |
| 4 | 0.12 | 0.9953 | 7 | 26.5 | 42.0176 | 26.8663 | 30.3853 | 0.3995 | 0.3313 |
| E-Co(III)—SbF6 | | | | | | | | | |
| 2 | 0.12 | 0.2203 | 2 | 2 | 37.1 | 10.12 | 52.11 | 0.63 | 0.04 |
| 3 | 0.12 | 0.67 | 4 | 6 | 25 | 12.25 | 62.12 | 0.65 | −0.02 |
| 4 | 0.12 | 0.4492 | 2.5 | 8.5 | 24.59 | 14.8 | 59.89 | 0.698 | 0.022 |
| 5 | 0.12 | 2.46 | 14 | 22.5 | 23.5 | 23.7 | 52.9 | | −0.1 |
| 6 | 0.12 | 1.268 | 7.00 | 29.5 | 29.11 | 29.86 | 39.97 | 0.614 | 0.446 |

Liquid Epoxy Resin Product, Total Chloride Comparison:

EPI/BPA coupling reaction using E-Co(III)-3NOBS: A mixture of epichlorohydrin (30.15 g) and bis-phenol A (8.21 g) was added to a large mouth jar containing 0.58 g of E-Co (III)-3NOBS. After 2.5 hours of stirring at room temperature a sample of the reaction product was analyzed by HPLC and found to have trace levels of the monochlorohydrin of bis-phenol A 98.6% DCHR and trace levels of the α-MCHR. The catalyst was removed from the product by filtering over a plug of glass wool followed by a second filtration through a 0.2 μm PTFE syringe filter. A total of 26.9 g of coupled product in epichlorohydrin was recovered and taken on to the next epoxidation step.

Epoxidation of E-Co(III)-3NOBS coupled EPI/BPA: 26.9 g of coupled EPI/BPA in epichlorohydrin was place into a 3 neck round bottom flask fitted with a mechanical stirrer and a nitrogen purge. To the stirred mixture was added 12 g of a water solution comprising 17 wt % sodium hydroxide and 0.1 ml of a 60 wt % benzyltrimethylammonium chloride in water solution. The mixture was stirred at room temperature for 30 min after which time stirring was stopped and the water and organic layers were allowed to separate. The bottom water layer was removed and a second addition of fresh 12 g of a water solution comprising 17 wt % sodium hydroxide and 0.1 ml of 60 wt % benzyltrimethylammonium chloride were added to the organic layer. After stirring 30 minutes at room temperature, the bottom water layer was again removed and a third dose of fresh 12 g water solution comprising 17 wt % sodium hydroxide and 0.1 ml of 60 wt % benzyltrimethylammonium chloride were added. After stirring for 30 minutes at room temperature, the water layer was separated from the organic layer. The organic layer was washed with water 3 times. The organic layer was cloudy after water washing and the final water was removed by coalescing via slow filtration through a dense plug of glass wool yielding a clear organic solution. The epichlorohydrin was removed first by rotary evaporation then by heating at 160° C. and 0.5 Torr using a Kugelrohr yielding the final liquid epoxy resin product. Total chloride measured by XRF (x-ray fluorescence) in the final resin=0.119% and hydrolyzable chloride=40 ppm.

Comparative example (Epoxidation of a commercial sample of coupled EPI/BPA provided by The Dow Chemical Co.): 30 g of EPI/BPA coupled product (produced using 21 wt % BPA in EPI, and benzyltrimethylammonium chloride catalyst under typical current commercial production conditions) was placed into a 3 neck round bottom flask fitted with a mechanical stirrer and a nitrogen purge. To the stirred mixture was added 13 g of a water solution comprising 17 wt % sodium hydroxide. The mixture was stirred at room temperature for 30 min after which time stirring was stopped and the water and organic layers were allowed to separate. The bottom water layer was removed and a second addition of fresh 13 g water solution comprising 17 wt % sodium hydroxide and 0.11 ml of 60 wt % benzyltrimethylammonium chloride were added to the organic layer. After stirring 30 minutes at room temperature, the bottom water layer was again removed and a third dose of fresh 13 g water solution comprising 17 wt % sodium hydroxide and 0.11 ml of 60 wt % benzyltrimethylammonium chloride were added. After stirring for 30 minutes at room temperature, the water layer was separated from the organic layer. The organic layer was washed with water 3 times. The organic layer was cloudy after water washing and the final water was removed by coalescing via slow filtration through a dense plug of glass wool yielding a clear organic solution. The unreacted epichlorohydrin was removed first by rotary evaporation then by heating at 160° C. 0.5 torr using a Kugelrohr to yield the final liquid epoxy resin product. XRF total chloride in final resin=0.356% and hydrolysable chloride=211 ppm.

While this invention has been described in detail for the purpose of illustration, it should not be construed as limited thereby but intended to cover all changes and modifications within the spirit and scope thereof.

The which claimed is:

1. A process comprising:
a) contacting bisphenol-A or a polyaliphatic alcohol selected from the group consisting of 1,3-propanediol, 1,4-butanediol, 1,5-pentanediol, 1,6-hexanediol, dipropylene glycol, polypropylene glycol, ethylene glycol, polyethylene glycol, neopentyl glycol, cyclohexane diol, hydrogenated bisphenol A, cyclohexane dimethanol, alkoxylated glycerol, castor oil, sorbitol, glycerol, pentaerthritol, linseed oil, and trimethylolpropane with an epihalohydrin in the presence of a catalyst comprising a Schiff base metal complex selected from the group consisting of a catalyst defined by the formula:

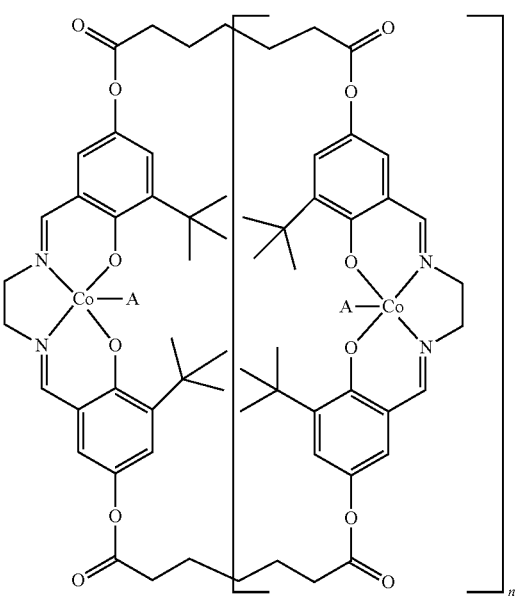

wherein A is 3-nitrobenzenesulfonate and n is an integer between 1 and 3 and a catalyst defined by the formula:

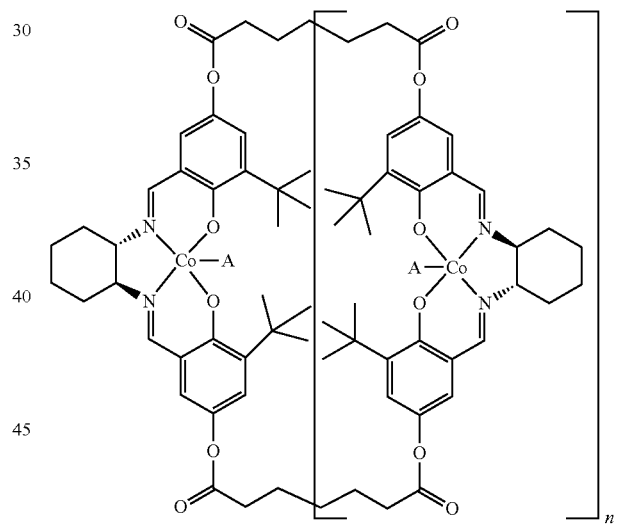

wherein A is 3-nitrobenzenesulfonate and n is an integer between 1 and 3 in a reaction zone under reaction conditions to produce a first reaction product comprising a halohydrin ether; and
b) contacting said halohydrin ether with a base in a reaction zone under reaction conditions to produce a second reaction product comprising an epoxy resin.

2. A process in accordance with claim 1 wherein said catalyst is present as a polymer and bound to a support.

3. A process in accordance with claim 1 wherein said catalyst is present as a copolymer and bound to a support.

4. A process in accordance with claim 1 wherein said catalyst is a diastereomeric, racemic, or non-racemic mixture.

5. A process in accordance with claim 1 wherein said epihalohydrin is epichlorohydrin.

6. A process in accordance with claim 1 wherein said epihalohydrin and said bisphenol-A or polyaliphatic alcohol are present in a ratio of moles of epihalohydrin to mole equivalents of OH functionality of from about 1:1 to about 40:1.

7. A process in accordance with claim 1 wherein said reaction conditions include a temperature in the range of from about −10° C. to about 140° C.

8. A process in accordance with claim 1 wherein said base is selected from the group consisting of an alkali hydroxide and an alkaline earth hydroxide.

9. A process in accordance with claim 8 wherein said alkali hydroxide is sodium hydroxide.

10. A process in accordance with claim 1 wherein greater than 95% of the hydroxide groups of the bisphenol-A or polyhydric alcohol are converted to halohydrin ether groups of the formula

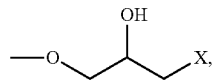

wherein X is a halogen, or glycidyl ether groups of the formula

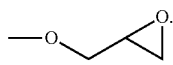

11. A process in accordance with claim 1 wherein the epoxy resin contains less than 0.2 wt % of halogen.

* * * * *